June 3, 1969     A. V. GRESS, JR     3,447,840
BEARING MEANS
Filed July 15, 1966

INVENTOR.
ALBERT V. GRESS, JR.
BY Ernest J. H...
HIS ATTORNEY

# United States Patent Office 3,447,840
Patented June 3, 1969

3,447,840
BEARING MEANS
Albert V. Gress, Jr., Dayton, Ohio, assignor to The Bendix Corporation, a corporation of Delaware
Filed July 15, 1966, Ser. No. 565,615
Int. Cl. F16c *1/24, 33/10, 33/74*
U.S. Cl. 308—5      2 Claims

ABSTRACT OF THE DISCLOSURE

Bearing means are disclosed for providing frictionless movement between two relatively movable members in which a commercial grade of plate glass is used as the way surface for the two members. The continuous strip of glass forms the way surface and also provides the reaction surface for a hydrostatic bearing.

---

This invention relates to bearing apparatus for providing frictionless relative movement between cooperating members and more particularly to precision ways for a movable carriage incorporating a hydrostatic (liquid or gaseous) bearing operative between said movable carriage and way.

Precision ways in the past usually consisted of a high grade hard material, such as stainless steel, secured to a soft base member. In order to assure a precise guiding surface for the second member or carriage, the base was required to be very precisely ground and finished prior to mounting the steel way to the base. Often the way was of such length that numerous steel sections were butted together to form the way. Once mounted on the base, the way was then finish ground to a precise straightness and smoothness. The way material, however, is not only very expensive but also the machining of such material involves considerable costs because it requires considerable time and causes high grade tools to wear relatively rapidly. Thus the proper machining and working of the way is time consuming work involving highly skilled labor and requires a number of tools.

When a hydrostatic bearing is incorporated in the carriage so as to direct the supporting fluid flow against the way, a higher degree of care is required to finish the surface of the way. For proper operation of the hydrostatic bearing, the way surface must be extremely smooth and flat. Thus, minute differences in the thickness of way pieces and particularly at the joint, will adversely affect the accuracy and operation of the bearing. In addition, chemical action and rusting of metallic ways mars the surface finish which will affect the proper operation of the hydrostatic bearing.

It is therefore an object of this invention to overcome the drawbacks of using metallic ways as the reaction surface of fluid bearings.

It is accordingly an object of this invention to provide an improved way surface which provides one continuous path per bearing wherein variations in operation caused by sectional way joints are eliminated.

Another object of this invention is to provide an improved reaction element for a hydrostatic bearing which has smooth finish requiring no working or machining, is rust resistant, chemical resistant, has a low co-efficient of expansion, is non-moisture absorbant, and which is of acceptably uniform thickness through extended lengths in commercially available grades and sizes.

It is a further object of this invention to provide a precision way having a continuous, smooth surface which is less costly and requires less time to mount and be operationally ready for use.

Yet another object is to use commercial plate glass in a new and novel application as an improved way reaction element for a fluid bearing.

Figure 1:
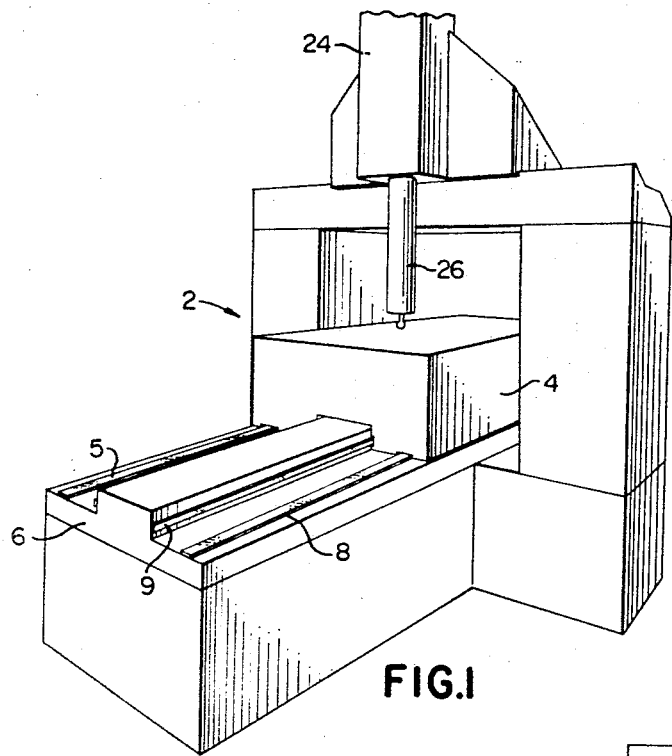
Figure 2:
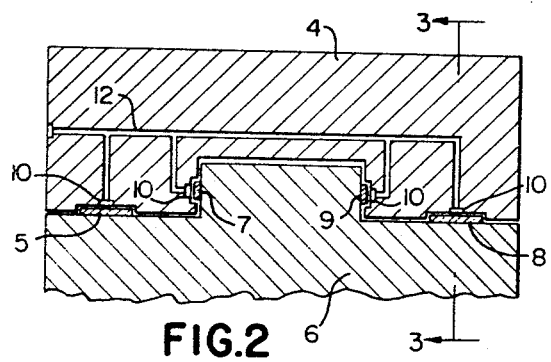
Figure 3:
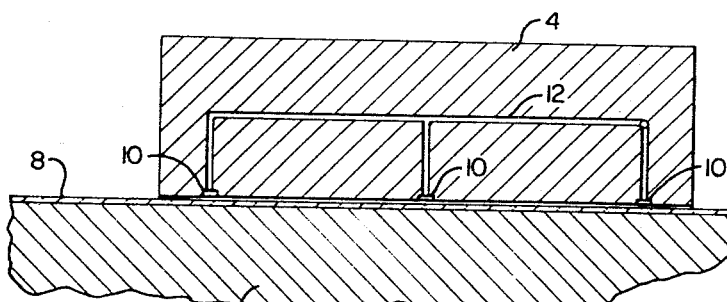

These and other objects and advantages of the invention will appear more clearly from the following description, the appended claims and the accompanying drawings, in which, FIG. 1 is a perspective view of an exemplary embodiment of the invention in a measuring machine, FIG. 2 is a sectional end view of the exemplary embodiment of the invention, FIG. 3 is a view taken through section 3—3 of FIG. 2.

Figure 4:
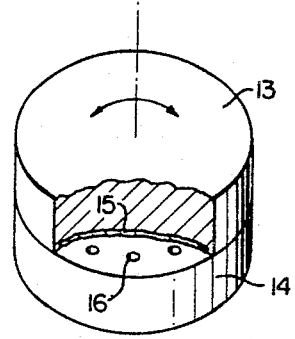
Figure 5:
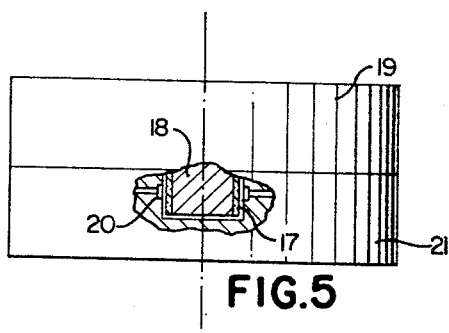

FIG. 4 is a simplified perspective view, partially broken away, showing the invention applied to the vertical support of the exemplary rotary table, and FIG. 5 illustrates diagrammatically its application to a rotary bearing.

Referring to the illustrative embodiment (FIGS. 1–3), there is shown generally at 2 a measuring machine of a bridge type construction having a work supporting movable X axis carriage member 4 mounted on base member 6. Precision ways 5, 7, 8, and 9, formed of continuous sheets or strips of commercially available plate glass, are secured to base 6 by any suitable means and provide the reaction surfaces for the hydrostatic bearings incorporated in the carriage. The base member 6 provides substantially planar surfaces to which one side of each respective glass way is secured in substantially uniform engagement, with the opposite side exposed for support and guidance. The planar surfaces of base 6 in the illustrated examplary application are parallel but are not all coplanar.

The bearings are shown generally as having hydrostatic pressure areas 10 which confine and direct the fluid against the ways and thereby cause carriage 4 to "float" on a film of pressurized fluid in a well known manner. It should be apparent that the pressure areas may be of any suitable shape and configuration. Conduit 12 connects the pressure area through passages in carriage 4 with an externally pressurized fluid supply not shown. It is seen in FIG. 3 that carriage 4 has a complementary surface corresponding with each glass way and the pressure area is formed by fluid exhausting through each complementary surface and between the complementary surfaces and glass sheets providing a frictionless separation for relative movement.

A Y axis carriage 24 carrying a measuring probe 26 is mounted to float on glass ways in the manner described for the X axis carriage.

The ways are continuous lengths of common ¼" commercial plate glass in this illustrative example. It has been found that by using the plate glass, the base need not be ground or finished to a fine surface. The properties of glass are such that it will flex a sufficient amount to comply or conform with the surface of the base; yet is sufficiently stiff so as to provide a straight, smooth surface. Being completely backed by the base, the glass has sufficient strength to support extremely heavy loads. Through the hydrostatic nature of the load transmittal the load is not concentrated as to area of application. Plate glass can be obtained in any length, thus eliminating the need to join way elements for long uses. The glass thus provides a continuous way surface having a smooth finish at a cost much less than an equivalent length of stainless steel.

In FIG. 4 an upper rotary member or table 13 is vertically supported for rotation on base member 14 through glass sheet 15 secured to a lower planar surface of table 13 and cooperating hydrostatic supply through passages 16 exhausting through the generally complementary upper surface of base 14. In FIG. 5 a rotary bearing is provided by the cooperation between the outer surface of a commercially available glass tube section 17 secured coaxially on an extension 18 of table 19 and hydrostatic supply passage openings in base 21.

Thus it may be seen that this invention accomplishes its stated objects. A glass way reactive surface is provided for a hydrostatic bearing which is superior to steel and metallic ways in that the glass provides one continuous smooth path per bearing which eliminates variations caused by sectional way joints. The arrangement according to the present invention represents a considerable saving in cost, material and work over heretofore known steel or metallic ways while improving the performance of the hydrostatic bearing.

What is claimed is:

1. Bearing means for providing frictionless relative movement between a machine base and supported carriage comprising,
   a machine base having a substantially planar surface extending in a given direction,
   a carriage mounted on said base for movement relative thereto,
   a continuous strip of common commercial grade plate glass having a length commensurate with the extent of relative movement between said base and carriage,
   means securing said strip of glass to the substantially planar surface of said machine base with one side in substantially uniform engagement therewith and spanning minor surface irregularities thereon and the opposite side of said strip of glass exposed to provide a continuous way surface for support and guidance of said carriage,
   said carriage having a surface generally complementary with said strip of glass,
   a plurality of orifices spaced along said carriage complementary surface and opening opposite said strip of glass,
   and means for supplying pressurized fluid to said orifices and exhausting said fluid through said orifices and against said strip of glass to provide a hydrostatic bearing to separate the opposing surfaces under fluid pressure and support said carriage whereby said glass strip provides a continuous reaction surface for said pressurized fluid and the load transmittal of said carriage is not concentrated as to area of application.

2. Bearing means for providing frictionless relative movement between a machine base and supported carriage comprising,
   a machine base having a plurality of non-coplanar substantially planar surfaces extending in parallel directions,
   a carriage mounted on said base for movement relative thereto,
   a continuous sheet of common commercial grade plate glass for each of said surfaces,
   means securing each of said sheets to the respective substantially planar surface of said machine base with one side in substantially uniform engagement therewith and spanning minor surface irregularities thereon and the opposite side of each of said sheets exposed to provide a continuous way surface for support and guidance of said carriage,
   said carriage having surfaces generally complementary to at least a portion of the opposite sides of each of said sheets,
   a plurality of orifices spaced along each of said carriage complementary surfaces and opening opposite said sheets,
   and means for supplying a separating fluid including passage means to each orifice in said carriage, said fluid exhausting through each of said orifices in said complementary surfaces and against each of said respective glass sheets and providing a frictionless separation of said machine base and carriage and support and guidance throughout the movement of said carriage along said glass sheets relative to said machine base.

References Cited

UNITED STATES PATENTS

| 229,039 | 6/1880 | Geyelin | 308—9 X |
| 2,675,276 | 4/1954 | Daugherty | 308—238 X |
| 2,923,342 | 2/1960 | Anderson | 308—5 X |
| 3,251,633 | 5/1966 | Mohsin | 308—5 |

FOREIGN PATENTS

Product Engineering, April 1956, pp. 156 and 157 (Air Bearing Levels Dividing Table).

CARROLL B. DORITY, JR., *Primary Examiner.*

U.S. Cl. X.R.

308—122